(12) United States Patent
Evans et al.

(10) Patent No.: US 7,891,702 B2
(45) Date of Patent: Feb. 22, 2011

(54) APPARATUS AND METHOD FOR ATTACHING PASSENGER SIDE INFLATABLE RESTRAINT CHUTE

(75) Inventors: Gregg S. Evans, Windsor (CA); Matt Gabriel, Shelby Township, MI (US)

(73) Assignee: Intertec Systems, LLC, Plymouth, MI (US)

( * ) Notice: Subject to any disclaimer, the term of this patent is extended or adjusted under 35 U.S.C. 154(b) by 174 days.

(21) Appl. No.: 12/412,080

(22) Filed: Mar. 26, 2009

(65) Prior Publication Data

US 2009/0243265 A1   Oct. 1, 2009

Related U.S. Application Data

(60) Provisional application No. 61/039,940, filed on Mar. 27, 2008.

(51) Int. Cl.
*B60R 21/205*   (2006.01)
(52) U.S. Cl. .................. 280/732; 280/728.2; 280/728.3
(58) Field of Classification Search .............. 280/728.2, 280/732, 728.3
See application file for complete search history.

(56) References Cited

U.S. PATENT DOCUMENTS

| | | | |
|---|---|---|---|
| 5,865,461 A | 2/1999 | Totani et al. | |
| 6,296,270 B1 | 10/2001 | Amamori | |
| 7,007,970 B2 | 3/2006 | Yasuda et al. | |
| 7,052,036 B2 | 5/2006 | Lee et al. | |
| 7,165,782 B2 | 1/2007 | Yasuda et al. | |
| 7,354,061 B2 | 4/2008 | Yasuda et al. | |
| 7,527,286 B2 * | 5/2009 | Beckley et al. ........... | 280/728.3 |
| 7,828,323 B1 * | 11/2010 | Mazzocchi et al. .......... | 280/732 |
| 2003/0205890 A1 * | 11/2003 | Davis et al. .................. | 280/732 |
| 2005/0225062 A1 * | 10/2005 | Dumbrique .............. | 280/728.3 |
| 2006/0022438 A1 | 2/2006 | Beckley et al. | |
| 2006/0175808 A1 | 8/2006 | Brandstatter | |
| 2007/0045995 A1 | 3/2007 | Adler et al. | |
| 2007/0045996 A1 | 3/2007 | Frisch | |
| 2007/0120346 A1 | 5/2007 | Kwon | |
| 2008/0211207 A1 | 9/2008 | Sato | |
| 2008/0211208 A1 | 9/2008 | Evans | |

* cited by examiner

*Primary Examiner*—Ruth Ilan
(74) *Attorney, Agent, or Firm*—Dykema Gossett PLLC (57) ABSTRACT

The invention provides for an apparatus and method for attaching a Passenger Side Inflatable Restraint (PSIR) chute. In one embodiment an automotive interior component comprises an automotive instrument panel having an outer surface and an inner surface. The automotive interior component further comprises an automotive PSIR hidden chute assembly contained behind the automotive instrument panel, wherein the PSIR hidden chute assembly has a chute and at least one PSIR door. The chute is connected to the inner surface of the automotive instrument panel. The automotive interior component further comprises a tuning clip connected to the chute and configured to engage the PSIR door. Engagement of the tuning clip to the PSIR door reduces deflection of the automotive instrument panel visible on the outer surface by biasing the PSIR door upward.

20 Claims, 9 Drawing Sheets

APPARATUS AND METHOD FOR ATTACHING PASSENGER SIDE INFLATABLE RESTRAINT CHUTE

CROSS-REFERENCE TO RELATED APPLICATION

This application claims the benefit of provisional patent application U.S. Ser. No. 61/039,940, filed Mar. 27, 2008, which is expressly incorporated herein by reference.

BACKGROUND a. Field of Invention

The invention relates generally to an automotive instrument panel having a Passenger Side Inflatable Restraint (PSIR) chute, and more particularly, to an apparatus and method for attaching a PSIR chute to an automotive instrument panel.

b. Description of Related Art

Automotive vehicles are commonly equipped with airbags for reducing driver and passenger injuries in the case of an accident. Automotive vehicle airbags are generally located in areas where a driver or passenger would potentially contact an automobile interior in the event of an accident. Such airbags can reduce injuries by providing a substantially non-solid surface for the driver or passenger to contact, as opposed to the generally solid surfaces of the automotive vehicle interior. Although the functionality of the airbag is greatly valued, the visual and aesthetic appeal of the automotive vehicle instrument panel, and invisibility of the airbag system are also of value to automotive vehicle manufacturers and consumers.

In order to install an airbag, the airbag is generally folded into a module that is installed into or behind an automotive interior component. The module housing a passenger-side airbag is generally installed on the underside of an automotive instrument panel, within a PSIR chute protruding behind the automotive instrument panel. The automotive instrument panel may generally have a pre-weakened area or line, allowing an airbag to release therethrough. A PSIR chute can be bonded to the automotive instrument panel, and can generally include PSIR doors that line up with the pre-weakened area or line of the automotive instrument panel.

Figure 1:
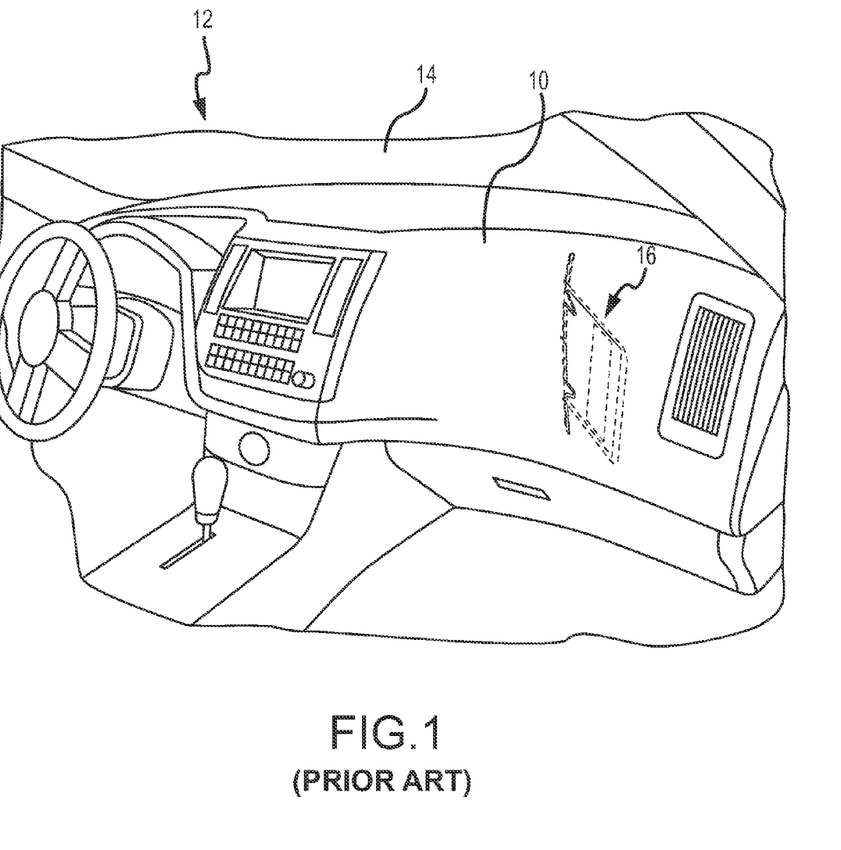
FIG. 1 is an illustration of an environmental perspective view of an exemplary automotive instrument panel containing a sectional view of a known mounted Passenger Side Inflatable Restraint (PSIR) chute assembly.
Figure 2:
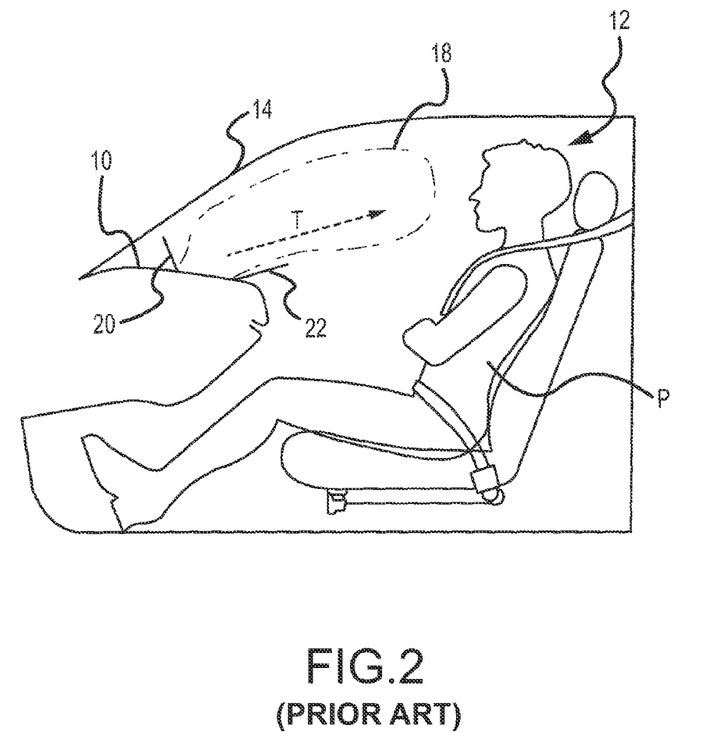
FIG. 2 is an illustration of a diagram illustrating the deployment characteristics of a PSIR airbag.
Figure 3:
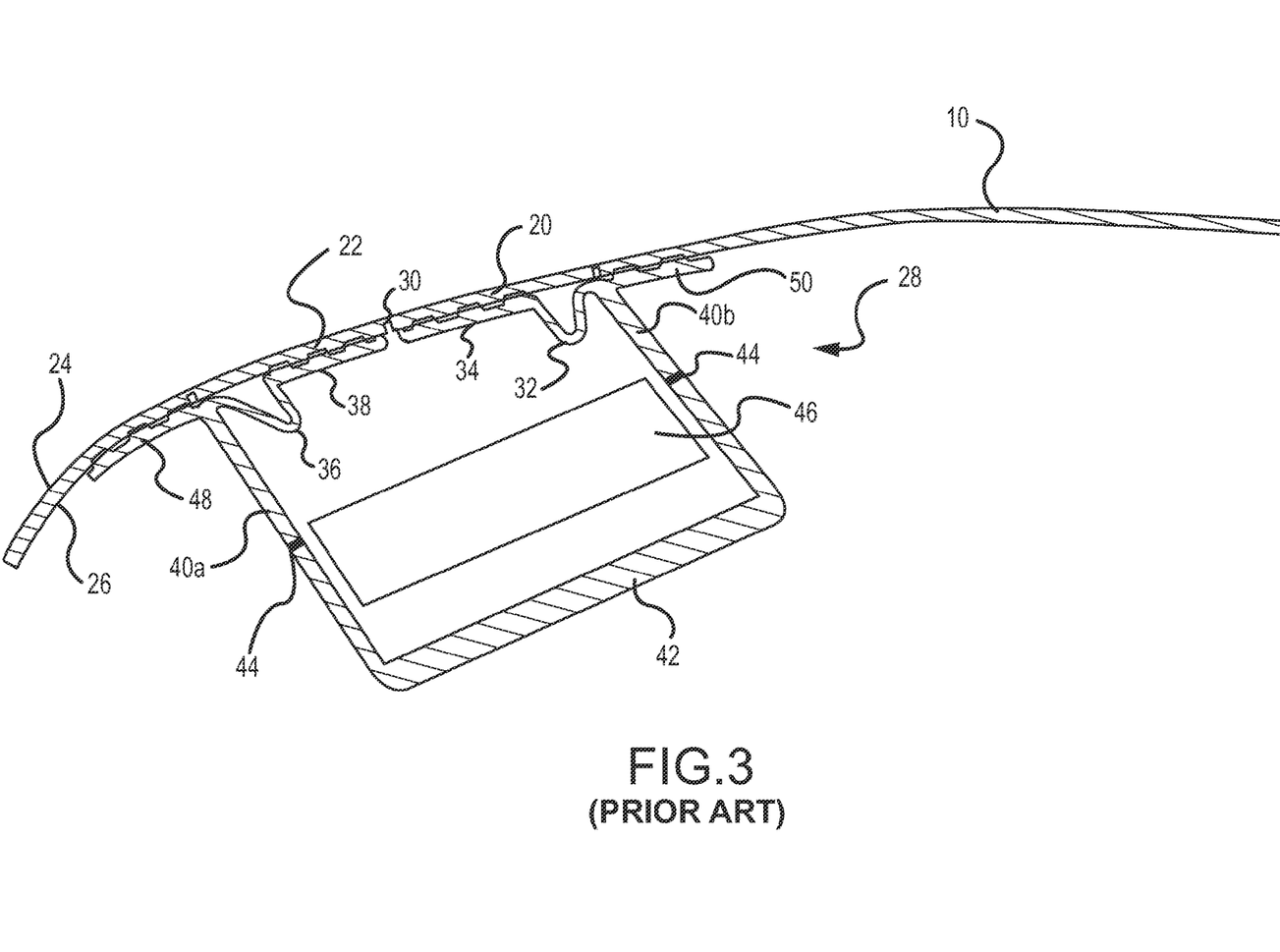
FIG. 3 is an illustration of sectional perspective view of a prior art PSIR chute assembly.

For example, FIG. 1 is an environmental perspective view of an exemplary automotive instrument panel 10 in an automotive interior 12. The automotive instrument panel 10 is adjacent windshield 14, and contains on its underside a sectional view of a conventionally mounted PSIR chute assembly 16. FIG. 2 is a diagram illustrating exemplary deployment characteristics of a typical PSIR airbag. Referring to FIG. 2, a passenger P is positioned on the passenger side of an automobile interior 12 in front of automotive instrument panel 10 and windshield 14, and deployed airbag 18 must open at a substantially oblique trajectory T relative to PSIR forward door 20 and PSIR rearward door 22. Referring to FIG. 3, a sectional perspective view of a conventional PSIR chute assembly 16 is shown. The PSIR chute assembly 16 is located behind automotive instrument panel 10 having an instrument panel outer surface 24 or "A" surface and attached to an instrument panel inner surface 26 or "B" surface. The PSIR chute assembly 16 comprises chute 28 located behind PSIR forward door 20 and PSIR rearward door 22 which are coupled at center score line 30. The PSIR chute assembly 16 includes a first chute hinge 32 hingedly connected to a chute forward door 34 and includes a second chute hinge 36 hingedly connected to a chute rearward door 38. The chute forward door 34 is located substantially directly behind the PSIR forward door 20, and the chute rearward door 38 is located substantially directly behind the PSIR rearward door 22. The PSIR chute assembly 16 further includes chute sidewalls 40a, 40b, and chute end wall 42 connected by connectors 44 and which contain and guide an airbag 46. The airbag 46 is contained within the chute sidewalls 40a, 40b, and chute end wall 42, and is deployed through chute doors 34, 38 and PSIR doors 20, 22 upon deployment. The PSIR chute assembly 16 further includes a first chute flange 48 and a second chute flange 50.

Figure 4:
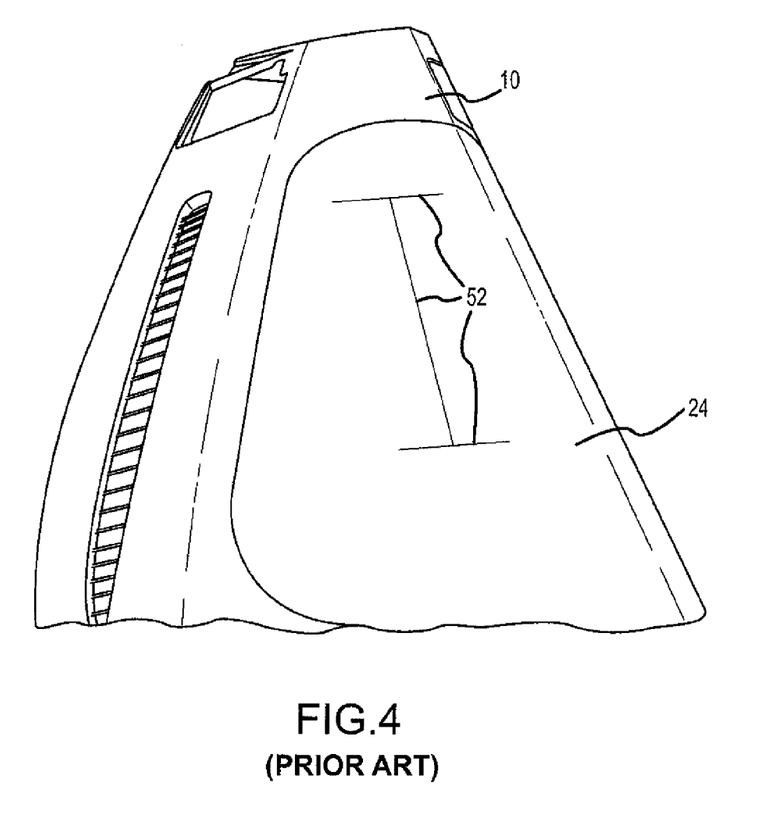
FIG. 4 is an illustration of a prior art automotive instrument panel with visible distortion.

Known methods for attaching a PSIR chute to an automotive instrument panel can include vibration welding the PSIR chute to the automotive instrument panel. Vibration welding joins components by "rubbing" such components together, creating heat through the friction, melting the connection points, and applying or holding pressure until the components cool together, thereby welding the components at the connection points. Welding melts the connection points between the instrument panel and PSIR chute, thus causing the volume of the melted instrument panel and PSIR chute material to shrink relative to the other surrounding material upon cooling and to shrink unevenly relative to each other. Namely, during the known vibration welding of an automotive instrument panel and PSIR chute, there is a deflection of score weakened PSIR door lines. As such, during the known vibration welding of an instrument panel and a PSIR chute, as shown in FIG. 4, there can be visible distortion 52 of the outer surface 24 of the automotive instrument panel 10.

It is desirable to manufacture a fully functional PSIR chute assembly without compromising the visual and aesthetic appeal of the automotive instrument panel. It would therefore be of benefit to provide an apparatus and method for attaching a PSIR chute to an automotive instrument panel that provides advantages over known components and manufacturing methods.

SUMMARY

The invention overcomes the drawbacks and deficiencies of known components and methods for attaching a PSIR chute to an automotive instrument panel by providing an automotive instrument panel and a PSIR chute having one or more tuning clips, by providing an apparatus and method for attaching a PSIR chute to an automotive instrument panel with the stresses which result in visibility, and then counteracting such bending stresses with localized loads induced by tuning clips.

In one of the advantageous embodiments of the invention there is provided an automotive interior component. The automotive interior component comprises an automotive instrument panel having an outer surface and an inner surface. The automotive interior component further comprises an automotive Passenger Side Inflatable Restraint (PSIR) hidden chute assembly contained behind the automotive instrument panel, wherein the PSIR hidden chute assembly has a chute and at least one PSIR door. The chute is connected to the inner surface of the automotive instrument panel. The automotive interior component further comprises a tuning clip connected to the chute and configured to engage the PSIR door. Engagement of the tuning clip to the PSIR door reduces deflection of the automotive instrument panel visible on the outer surface by biasing the PSIR door upward. Engagement of the plurality of tuning clips to the PSIR forward door and the PSIR rearward door reduces deflection of the automotive instrument panel visible on an outer surface by biasing the PSIR forward door and PSIR rearward door upward.

In another one of the advantageous embodiments of the invention there is provided an apparatus for attaching an automotive Passenger Side Inflatable Restraint (PSIR) hidden chute assembly to an automotive instrument panel. The apparatus comprises a PSIR hidden chute assembly having a chute, a PSIR forward door, and a PSIR rearward door, the chute being connected to an inner surface of an automotive instrument panel. The apparatus further comprises a plurality of tuning clips connected to the chute and configured to engage at least one of the PSIR forward door and the PSIR rearward door. The engagement of the plurality of tuning clips to the PSIR forward door and the PSIR rearward door reduces deflection of the automotive instrument panel visible on an outer surface by biasing the PSIR forward door and PSIR rearward door upward.

In another one of the advantageous embodiments of the invention there is provided a method for manufacturing an automotive interior component. The method comprises the steps of providing an automotive instrument panel, providing a Passenger Side Inflatable Restraint (PSIR) chute assembly having a tuning clip and a PSIR door, aligning the automotive instrument panel to the PSIR door, heating a connection between the PSIR chute assembly and the automotive instrument panel, cooling the connection between the PSIR chute assembly and the automotive instrument panel, and engaging the tuning clip to bias the PSIR door.

Additional features, advantages, and embodiments of the invention may be set forth or become apparent from consideration of the following detailed description, drawings, and claims. Moreover, it is to be understood that both the foregoing summary of the invention and the following detailed description are exemplary and intended to provide explanation without limiting the scope of the invention as claimed.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Turning now to the drawings wherein like reference characters refer to like and corresponding parts throughout the several views, FIGS. 6-10 illustrate an apparatus and method for attaching a passenger side inflatable restraint (PSIR) chute to an automotive instrument panel according to the invention.

Figure 5:
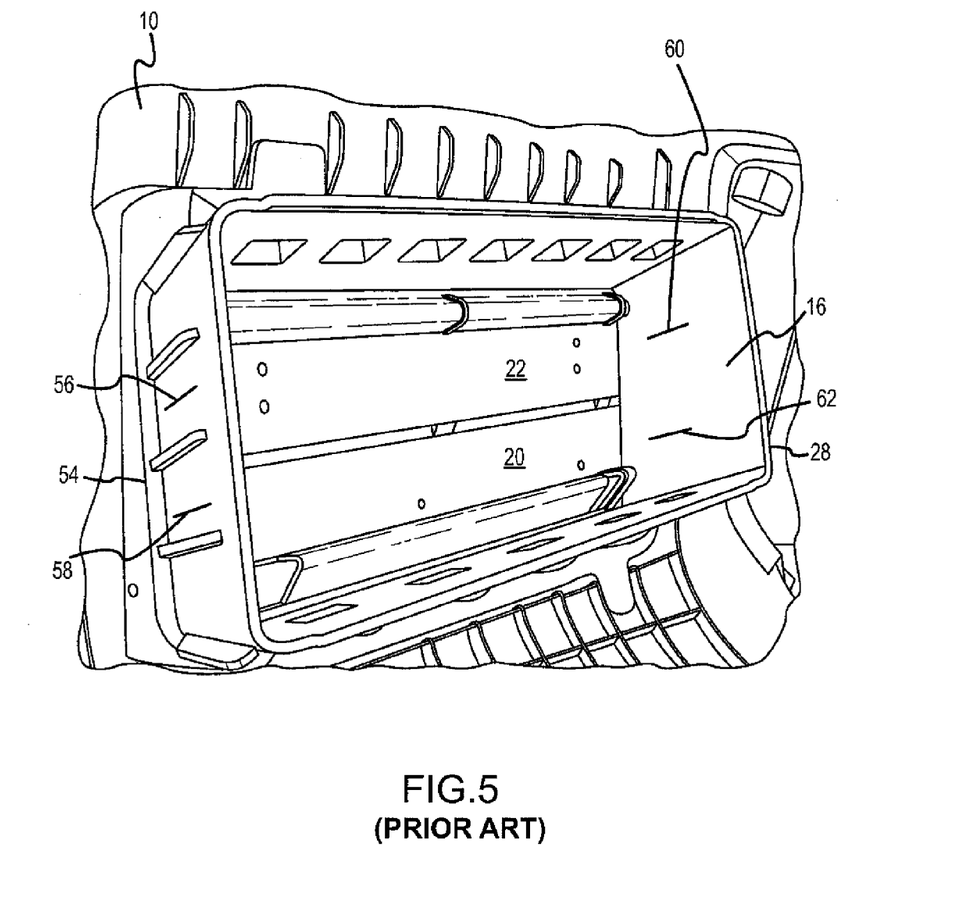
FIG. 5 is an illustration of a prior art PSIR chute from an underside of an automotive instrument panel.

FIG. 4 is an illustration of a prior art automotive instrument panel 10 having an automotive instrument panel outer surface 24 or "A" surface with visible PSIR distortion 52. PSIR distortion 52 on the automotive instrument panel outer surface 24 corresponds to vibration welded edges 54, as shown in FIG. 5, behind or under the automotive instrument panel 10. The visible PSIR distortion is the result of the weld shrinkage force that causes bending at the preweakened lines just after vibration welding as the part cools. FIG. 5 is an illustration of a prior art PSIR chute 28 from an underside of automotive instrument panel 10. FIG. 5 shows automotive instrument panel 10 with PSIR chute assembly 16 having PSIR chute 28, and having PSIR forward door 20 and PSIR rearward door 22. FIG. 5 further shows tuning clip locations 56, 58, 60, and 62, displaying exemplary locations for including tuning clips (see FIG. 7) according to the invention.

Figure 6:
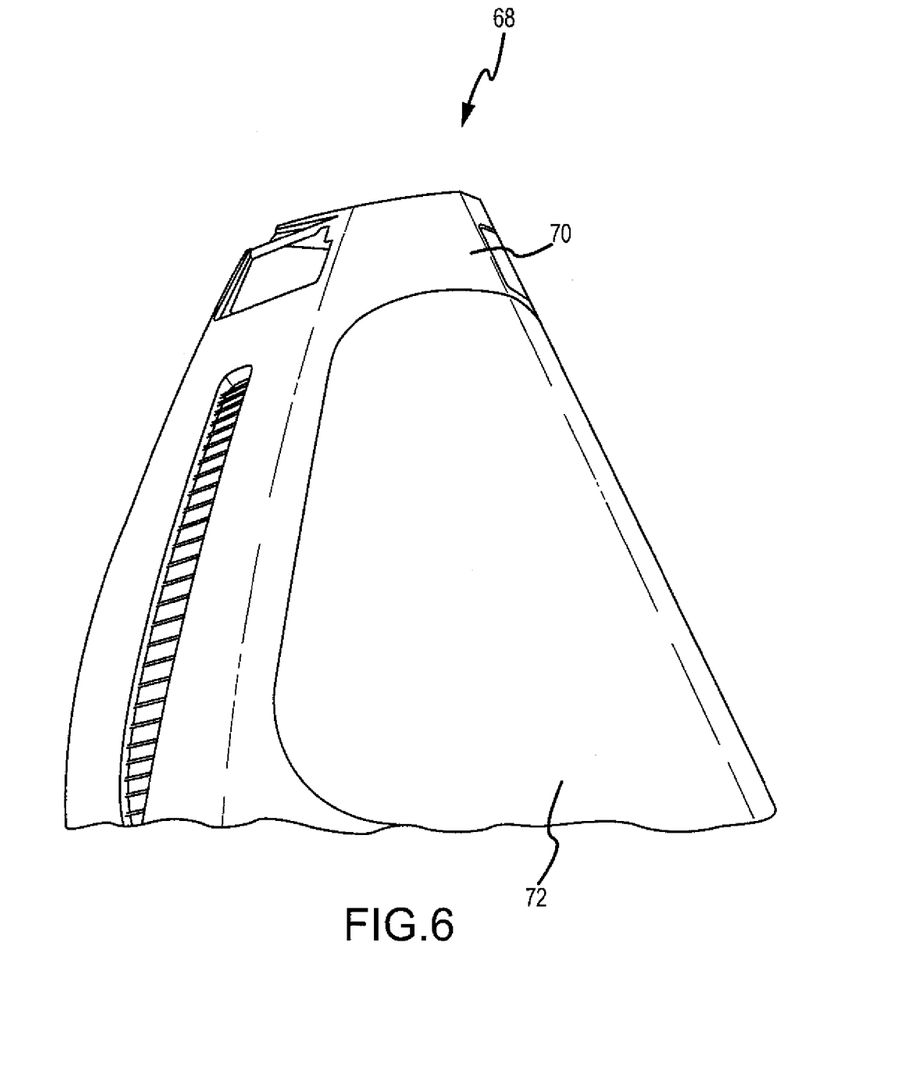
FIG. 6 is an illustration of one of the embodiments of an automotive instrument panel in accordance with the invention.
Figure 7:
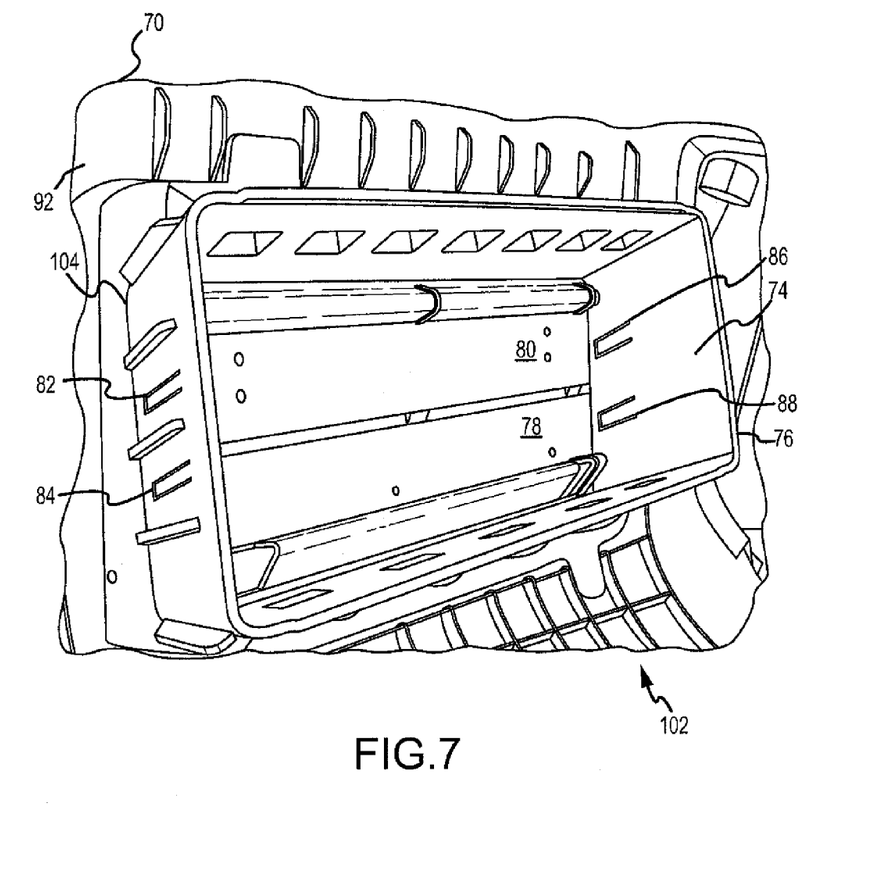
FIG. 7 is an illustration of one of the embodiments of a PSIR chute from an underside of an automotive instrument panel in accordance with the invention.

FIGS. 6-7 are illustrations of one of the embodiments of an automotive interior component 68 in accordance with the invention. As shown in FIG. 6, the automotive interior component 68 comprises an automotive instrument panel 70 having an automotive instrument panel outer surface 72 or "A" surface with no visible distortion 52 (see FIG. 4) in accordance with the invention. FIG. 7 is an illustration of one of the embodiments of a PSIR chute 76 from an underside of an automotive instrument panel 70 in accordance with the invention. The automotive interior component 68 comprises an automotive instrument panel 70 having an outer surface 72 and an inner surface 92 (see FIG. 8). As shown in FIG. 7, the automotive interior component 68 further comprises an automotive Passenger Side Inflatable Restraint (PSIR) hidden chute assembly 74 contained behind the automotive instrument panel 70. The PSIR hidden chute assembly 74 has a chute 76 and at least one PSIR door, such as PSIR forward door 78 and/or PSIR rearward door 80. The chute 76 may be connected to the inner surface 92 of the automotive instrument panel 70. The automotive interior component 68 further comprises at least one tuning clip 82 connected to the chute 74 and configured to engage the PSIR door 80. Engagement of the tuning clip 82 to the PSIR door 80 reduces deflection of the automotive instrument panel 70 visible on the outer surface 72 by biasing the PSIR door 80 upward. Preferably, the automotive interior component 68 comprises a plurality of tuning clips, preferably four tuning clips 82, 84, 86, and 88, according to the invention. However, other suitable numbers of tuning clips, such as two, three, or four may also be used. FIG. 7 shows tuning clips 82, 84, 86, and 88. The tuning clips 82, 84, 86, 88 may also be referred to as snap tabs and may be snapped into place in the PSIR chute 76. The tuning clips and the chutes they are part of are comprised of high rubber TPO (thermoplastic olefin) or similar ductile plastic blends.

Figure 8:
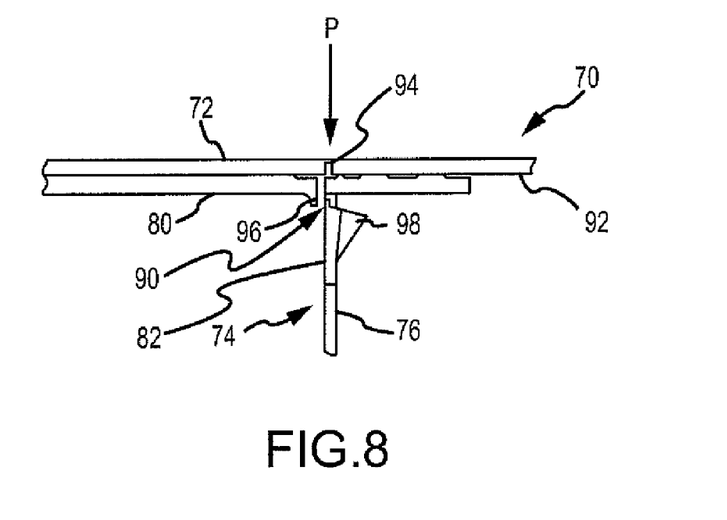
FIG. 8 is an illustration of a cross-sectional view of a PSIR chute assembly bonded to an automotive instrument panel with a tuning clip in a disengaged position.

FIG. 8 is an illustration of a cross-sectional view of PSIR chute assembly 74 bonded to automotive instrument panel 70 with a tuning clip 82 in a disengaged position 90. The other tuning clips 84, 86, 88 (not shown) may also be in a disengaged position 90. The automotive instrument panel 70 has an outer surface 72 or "A" surface and an inner surface 92 or "B"

surface. The inner surface 92 is bonded to the PSIR chute assembly 74, including PSIR rearward door 80 and PSIR forward door 78 (not shown), in general alignment with a side score line 94 forming one end of the "H" shaped pattern or weakened area of the automotive instrument panel 70. The automotive instrument panel 70 may be bonded to the PSIR hidden chute assembly 74 via vibration welding or similar heat based bonding methods. The PSIR chute assembly 74 further includes a chute 76 and tuning clips 82 (shown), 84, 86, 88 (not shown). The PSIR door 80 preferably has a protruding portion 96 or edge for engagement with the tuning clip 82. PSIR door 78 preferably also has a protruding portion 96. The tuning clip 82 is configured to engage the protruding portion 96 or edge of PSIR door 80. FIG. 8 shows the tuning clip 82 in a disengaged position 90. In the disengaged position, the tuning clip 82 is disengaged from the protruding portion 96 of the PSIR door 80 prior to manual setting of the tuning clip 82. Similarly, tuning clips 84, 86, 88 (not shown) may be disengaged from one of at least PSIR forward door 78 and PSIR rearward door 80.

The tuning clip 82 may be originally and consistently biased away from the protruding portion 96 of PSIR door 80, as shown in FIG. 3. The tuning clip 82 or tuning clips 82, 84, 86, 88 may be manually engaged to the PSIR door 80 or PSIR doors 80, 78. The tuning clip 82 preferably has a handle portion 98 upon which a sufficient amount of manual pressure P may be applied to the handle portion 98 to engage the tuning clip 82 to the PSIR door 80. Upon the application of sufficient manual pressure P to the handle portion 98 of the tuning clip 82, the tuning clip 82 may overcome the original bias and snap under the protruding portion 96 to engage the PSIR door 80. Each tuning clip 82 engages the protruding portion 96 of each respective door end.

Figure 9:
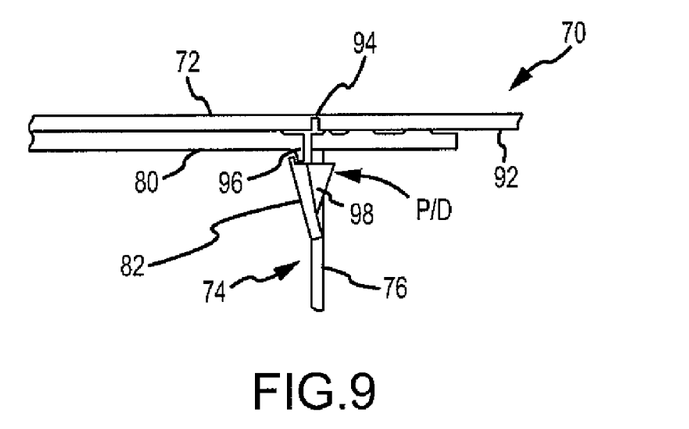
FIG. 9 is an illustration of a cross-sectional view of the PSIR chute assembly of FIG. 8 bonded to an automotive instrument panel with a tuning clip in an engaged position; and, FIG. 10 is an illustration of a flow diagram of the steps of one of the embodiments of the method in accordance with the invention.

FIG. 9 is an illustration of a cross-sectional view of the PSIR chute assembly 74 of FIG. 8 bonded to the automotive instrument panel 70 with the tuning clip 82 in an engaged position 100. After such engagement, pressure P is released and the protruding portion 96 of the PSIR door 80 is engaged. The tuning clip 82 engages the protruding portion 96 of the PSIR door 80 preferably with manual pressure P or force in direction D, that is, P/D. The tuning clip 82 snaps into place behind protruding portion 96. The tuning clip 82 can consistently bias the PSIR door 80 upward. Similarly, tuning clips 84, 86, 88, can engage additional protrusions of PSIR doors 80, 78 and can consistently bias the PSIR doors 80, 78 upward. By biasing the PSIR door 80 upward with the tuning clip 82, any visible distortion 52 (see FIG. 4) on the automotive instrument panel outer surface 70 that may occur during the resulting shrinkage after vibration welding and/or similar heat bonding processes may be substantially reduced or eliminated (see FIG. 6).

In another one of the embodiments of the invention there is provided an apparatus 102 (see FIG. 7) for attaching an automotive PSIR hidden chute assembly 74 to an automotive instrument panel 70. The apparatus 102 comprises a PSIR hidden chute assembly 74 having chute 76, PSIR forward door 78, and PSIR rearward door 80. The chute 74 is preferably connected to an inner surface 92 (see FIG. 8) of automotive instrument panel 70. The apparatus 102 further comprises a plurality of tuning clips 82, 84, 86, 88 connected to the chute 74 and configured to engage at least one of the PSIR forward door 78 and the PSIR rearward door 80. The engagement of the plurality of tuning clips 82, 84, 86, 88 to the PSIR forward door 78 and the PSIR rearward door 80 reduces deflection of the automotive instrument panel 70 visible on an outer surface 72 (see FIG. 8) by biasing the PSIR forward door 78 and PSIR rearward door 80 upward. The plurality of tuning clips preferably comprises four tuning clips. However, other numbers of tuning clips may also be used. As shown in FIG. 8, the PSIR rearward door 80 preferably has a protruding portion 96 for engagement with at least one of the plurality of tuning clips 82, 84, 86, 88. Similarly, the PSIR forward door 78 preferably has a protruding portion 96 for engagement with at least one of the plurality of tuning clips 82, 84, 86, 88. The automotive instrument panel 70 is preferably bonded to the PSIR hidden chute assembly 74 via vibration welding or another suitable bonding process. The plurality of tuning clips 82, 84, 86, 88 are preferably manually engaged to the PSIR forward door 78 and the PSIR rearward door 80. Preferably, each of the plurality of tuning clips 82, 84, 86, 88 has a handle portion 98 upon which a sufficient amount of manual pressure may be applied to the handle portion 98 to engage the plurality of tuning clips to the PSIR forward door 78 and the PSIR rearward door 80.

Figure 10:
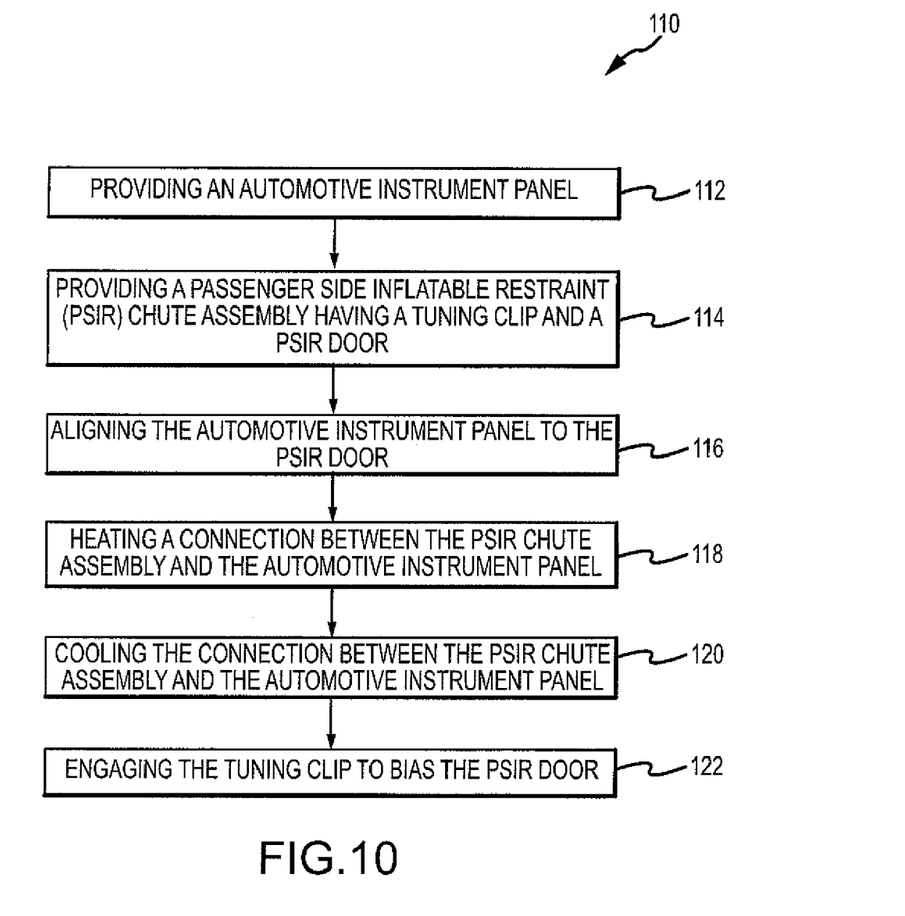

FIG. 10 is an illustration of a flow diagram of the steps of one of the embodiments of a method 110 in accordance with the invention. A method 110 for manufacturing an automotive interior component 68 (see FIG. 6) is provided. The method 110 comprises step 112 of providing an automotive instrument panel 70 (see FIGS. 6-9). The automotive instrument panel 70 has an outer surface 72 and an inner surface 92. The method 110 further comprises step 114 of providing a Passenger Side Inflatable Restraint (PSIR) chute assembly 74 having a tuning clip 82 (see FIGS. 7-9) and a PSIR door 80 (see FIGS. 7-9). The method 110 may comprise a PSIR chute assembly 74 having a plurality of four tuning clips 82, 84, 86, 88. The method 110 preferably comprises a PSIR chute assembly 74 having a PSIR forward door 78 and PSIR rearward door 80. The PSIR rearward door 80 may comprise a protruding portion 96. Similarly, the PSIR forward door 78 may comprise a protruding portion 96. The PSIR chute assembly 74 may further comprise a chute 76. The method 110 further comprises step 116 of aligning the automotive instrument panel 70 to the PSIR door 80. The method 110 further comprises step 118 of heating a connection 104 (see FIG. 7) between the PSIR chute assembly 74 and the automotive instrument panel 70. The connection 104 may further comprise vibration welding or another suitable connection process. The method 110 further comprises step 120 of cooling the connection 104 between the PSIR chute assembly and the automotive instrument panel, including cooling the PSIR chute assembly and the automotive instrument panel. The cooling may occur naturally in ambient temperature or via another suitable cooling method. The method 110 further comprises step 122 of engaging the tuning clip 82 after the connection, the PSIR chute assembly and automotive instrument panel cools, to bias the PSIR door 80, preferably biasing the PSIR door 80 upward. The tuning clip 82 is preferably connected to the chute 76 and configured to engage the protruding portion 96 of the PSIR door 80. The tuning clip 82 may have a handle portion 98 upon which a sufficient amount of manual pressure is applied to the handle portion 98 to engage the tuning clip 82 to the PSIR door 80.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An automotive interior component comprising:
   an automotive instrument panel having an outer surface and an inner surface;

an automotive Passenger Side Inflatable Restraint (PSIR) hidden chute assembly contained behind the automotive instrument panel, wherein the PSIR hidden chute assembly has a chute and at least one PSIR door, the chute being connected to the inner surface of the automotive instrument panel; and, a tuning clip connected to the chute and configured to engage the PSIR door;

wherein engagement of the tuning clip to the PSIR door reduces deflection of the automotive instrument panel visible on the outer surface by biasing the PSIR door upward.

2. The automotive interior component of claim 1, further comprising a plurality of tuning clips.

3. The automotive interior component of claim 2, wherein the plurality of tuning clips comprises four tuning clips.

4. The automotive interior component of claim 1, wherein the PSIR door has a protruding portion for engagement with the tuning clip.

5. The automotive interior component of claim 1, further comprising a PSIR forward door and PSIR rearward door.

6. The automotive interior component of claim 1, wherein the automotive instrument panel is bonded to the PSIR hidden chute assembly via vibration welding.

7. The automotive interior component of claim 1, wherein the tuning clip is manually engaged to the PSIR door.

8. The automotive interior component of claim 1, wherein the tuning clip has a handle portion upon which a sufficient amount of manual pressure is applied to the handle portion to engage the tuning clip to the PSIR door.

9. An apparatus for attaching an automotive Passenger Side Inflatable Restraint (PSIR) hidden chute assembly to an automotive instrument panel comprising:

a PSIR hidden chute assembly having a chute, a PSIR forward door, and a PSIR rearward door, the chute being connected to an inner surface of an automotive instrument panel; and, a plurality of tuning clips connected to the chute and configured to engage at least one of the PSIR forward door and the PSIR rearward door;

wherein engagement of the plurality of tuning clips to the PSIR forward door and the PSIR rearward door reduces deflection of the automotive instrument panel visible on an outer surface by biasing the PSIR forward door and PSIR rearward door upward.

10. The apparatus of claim 9, wherein the plurality of tuning clips comprises four tuning clips.

11. The apparatus claim 9, wherein the PSIR forward door has a protruding portion for engagement with at least one of the plurality of tuning clips, and wherein the PSIR rearward door has a protruding portion for engagement with at least one of the plurality of tuning clips.

12. The apparatus of claim 9, wherein the automotive instrument panel is bonded to the PSIR hidden chute assembly via vibration welding.

13. The apparatus of claim 9, wherein the plurality of tuning clips are manually engaged to the PSIR forward door and the PSIR rearward door.

14. The apparatus of claim 9, wherein each of the plurality of tuning clips has a handle portion upon which a sufficient amount of manual pressure is applied to the handle portion to engage the plurality of tuning clips to the PSIR forward door and the PSIR rearward door.

15. A method for manufacturing an automotive interior component comprising:

providing an automotive instrument panel having an outer surface and an inner surface;

providing a Passenger Side Inflatable Restraint (PSIR) chute assembly having a tuning clip and a PSIR door;

aligning the automotive instrument panel to the PSIR door;

heating a connection between the PSIR chute assembly and the automotive instrument panel;

cooling the connection between the PSIR chute assembly and the automotive instrument panel; and, engaging the tuning clip to bias the PSIR door upward, wherein engagement of the tuning clip to the PSIR door reduces deflection of the automotive instrument panel visible on the outer surface.

16. The method of claim 15, wherein the PSIR chute assembly further comprises a chute and the PSIR door comprises a protruding portion, and wherein the tuning clip is connected to the chute and configured to engage the protruding portion of the PSIR door.

17. The method of claim 15, wherein heating the connection further comprises vibration welding.

18. The method of claim 15, further comprising a plurality of four tuning clips.

19. The method of claim 15, further comprising a PSIR forward door and PSIR rearward door.

20. The method of claim 15, wherein the tuning clip has a handle portion upon which a sufficient amount of manual pressure is applied to the handle portion to engage the tuning clip to the PSIR door.

* * * * *